United States Patent Office 3,079,899
Patented Mar. 5, 1963

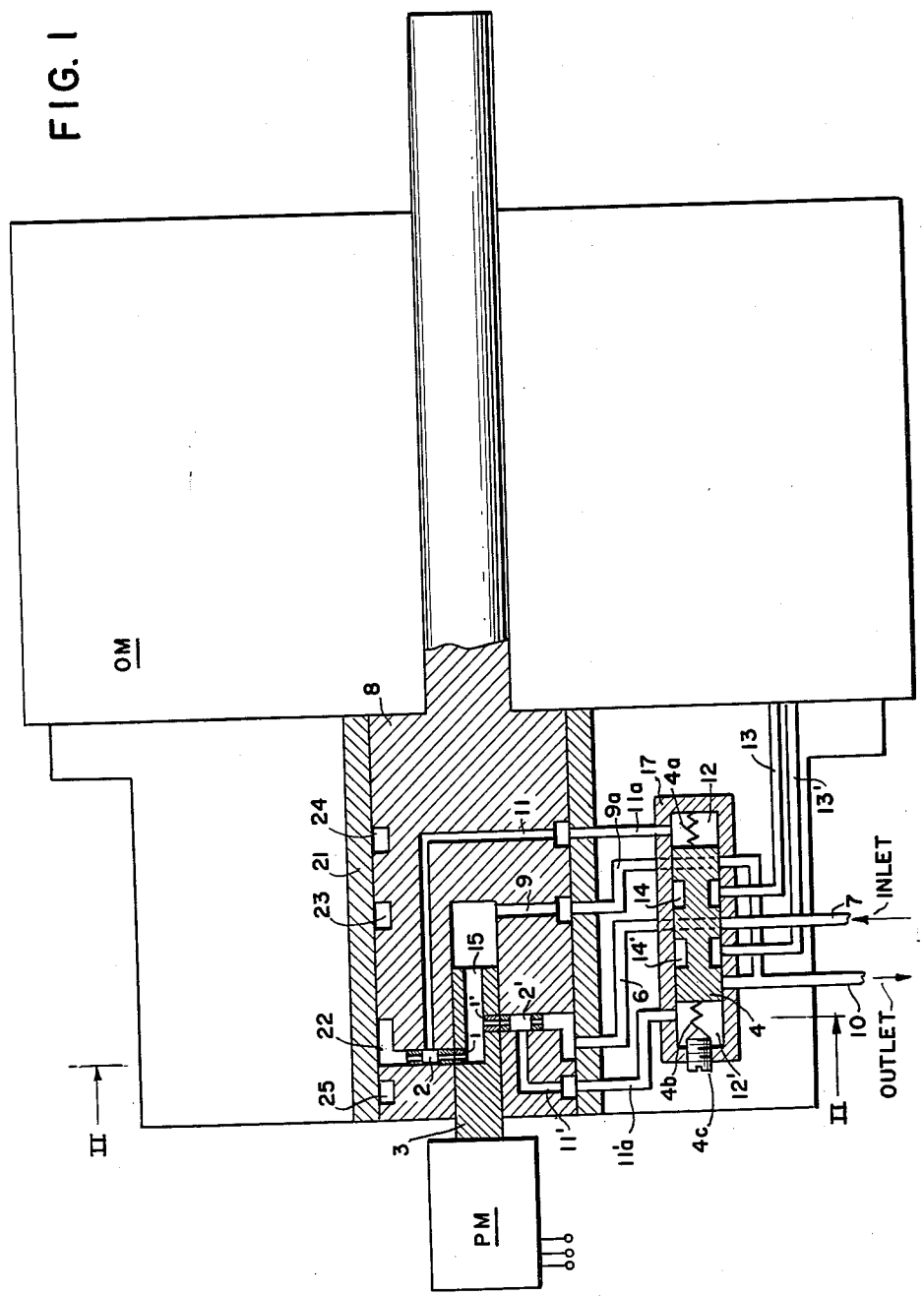

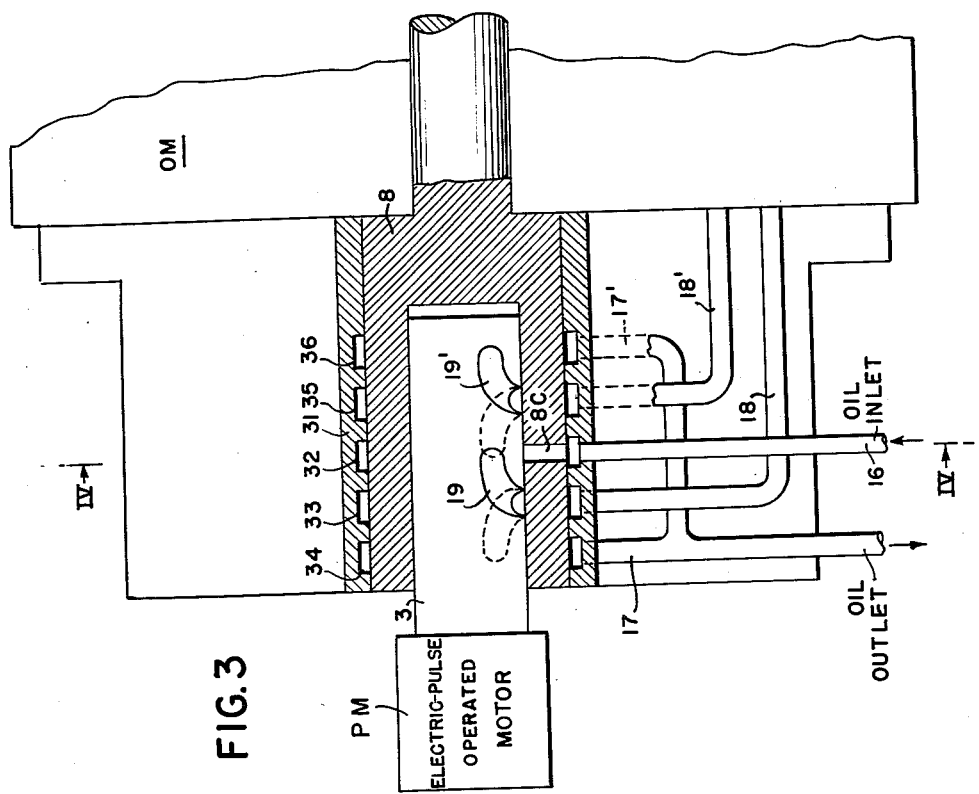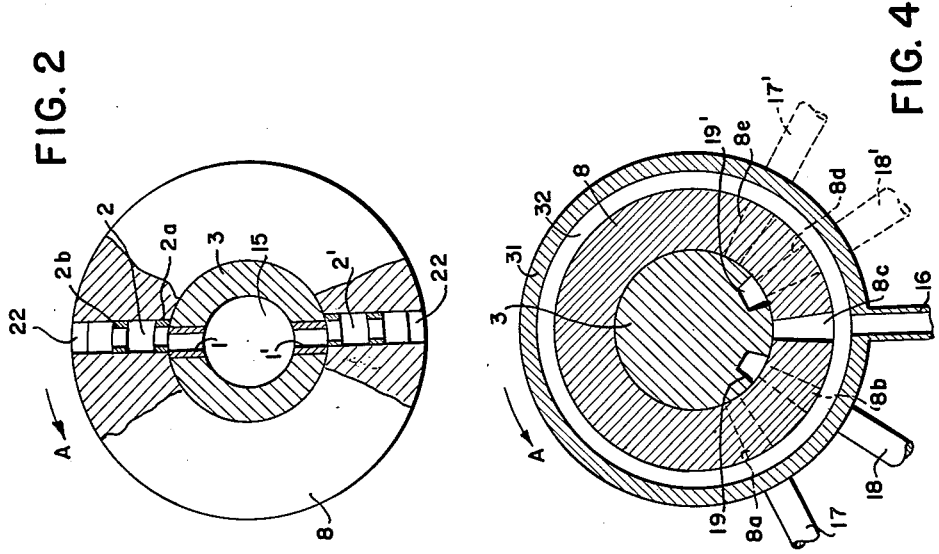

3,079,899
FEEDBACK-TYPE OIL-HYDRAULIC DRIVE
Seiuemon Inaba and Norito Yoshitake, Kawasaki-shi, and Tokiji Shimajiri, Yokohama, Japan, assignors to Fuji Tsushinki Seizo Kabushiki Kaisha, Kawasaki, Japan, a corporation of Japan
Filed May 23, 1960, Ser. No. 30,938
Claims priority, application Japan May 29, 1959
6 Claims. (Cl. 121—41)

Our invention relates to hydraulic drives of the type operating as feedback-controlled torque amplifiers and comprising a rotating main power motor supplied with hydraulic pressure medium under control by a rotatable hydraulic pressure medium under control by a rotatable pilot member, such as a stroke or pulse motor driven by signal pulses, whose speed of rotation determines that of the main motor and which requires but a slight power input in comparison with the high power output of the main motor.

In known oil-hydraulic drives of this type, the flow of hydraulic medium to the main motor is controlled by a pilot-controlled servovalve, which requires a feedback connection to the machinery driven by the main motor.

It is an object of our invention to devise an improved hydraulic, feedback-controlled rotary drive which performs a reliable and continuous speed control and regulation by purely mechanical feedback means inherent in the structural components of the drive itself, thus making it a self-sufficient control unit not requiring a speed-responsive feedback connection to the machinery being driven.

To this end, and according to a feature of our invention, the flow of hydraulic pressure fluid from the supply line to the hydraulic rotary power motor is controlled by the pulse motor or other rotatable pilot member serving as a speed reference, with the aid of a hydraulic pressure control device which comprises two concentrically rotatable structures of which one rotates with the pilot member and the other with the power motor and which engage each other by a gliding valve fit at respective contact surfaces so that the two structures will angularly shift relative to each other when the speed of the power motor departs in magnitude or direction from the speed of the pilot member. The two structures are provided with valve ducts and ports so that the connection and disconnection, or the increase and decrease in port area, occurring at the valve contact surfaces due to relative angular displacement of the two structures, correspondingly controls or varies the flow of pressure fluid through the power motor. Thus the rotary structure joined with the power motor constitutes a direct mechanical feedback as required for the desired follow-up speed control.

According to another, more specific feature of the invention, the above-mentioned two structures are constituted by the shafts of the pilot member and the power motor respectively, or are coaxially joined with said shafts. Preferably, the shaft of the power motor has a center bore in gliding engagement with the pilot shaft, with the ducts and ports located at the mutually engaging peripheral shaft surfaces.

The hydraulic pressure controlled by the pilot rotation and by the feedback from the power motor can be applied directly to the power motor for driving the latter. According to another feature of the invention, however, the pilot-and-feedback controlled pressure serves to control a hydraulic pre-amplifier which in turn controls the pressure supply to the power motor.

The foregoing and other objects, advantages and features of our invention, said features being set forth with particularity in the claims annexed hereto, will emerge from the following description in conjunction with the accompanying drawings which, by way of example, schematically illustrate two embodiments of oil-hydraulic rotary drives according to the invention.

FIG. 1 is a partly sectional view of an oil-hydraulic drive of the feedback type provided with a hydraulic pre-amplifier, and FIG. 2 is an axial, sectional view taken along the line II—II in FIG. 1.

FIG. 3 is an axial, partly sectional view of another oil-hydraulic drive not including a hydraulic pre-amplifier, and FIG. 4 is a cross section taken in the vertical transverse plane denoted in FIG. 3 by the line IV.

Referring to FIGS. 1 and 2, the shaft 3 of an electric-pulse operated motor PM to operate as a speed-reference pilot is glidingly fitted into a central axial bore of the shaft 8 of an oil-hydraulic power motor OM so that the pilot shaft 3 can rotate within the bore of the power drive shaft 8 in hydraulically sealed relation thereto. The pilot shaft 3 has a central bore 15 to serve as an oil duct and is provided with two radial nozzle openings in which ring-shaped orifice members 1 and 1' respectively are seated on diametrically opposite locations. The orifices are shown to register with respective nozzle ducts 2 and 2' in shaft 8. Each of ducts 2 and 2' is provided with two nozzle-orifice members such as those denoted by 2a and 2b in FIG. 2. The nozzle-duct space between the orifice members 2a and 2b communicates with a duct 11 in shaft 8, and the corresponding space of nozzle duct 2' communicates with another duct 11' in shaft 8. The axial bore 15 of pilot shaft 3 is in communication with a third duct 9 in shaft 8.

The shaft 8 is surrounded by a sealed sleeve 21 which is stationarily mounted on the machine structure. An annular peripheral groove 22 of drive shaft 8 communicates through the orifice members 2a with the respective nozzle ducts 2 and 2', thus continuously connecting the two nozzle ducts during rotation of shaft 8 with an oil passage 6 communicating with an inlet conduit 7 for the supply of oil under pressure.

Another peripheral channel 23 of shaft 8, sealed by means of the sleeve 21, communicates through the duct 9 with the axial center bore 15 of the pilot shaft 3 and establishes a communication through a stationary passage 9a with an oil outlet conduit 10. Another peripheral channel 24 of shaft 8 is in continuous communication through duct 11 with the nozzle duct 2 and thus continuously connects the nozzle duct with a pressure passage 11a which communicates with a chamber 12 formed between the cylinder 17 and the displaceable piston or spool 4 of a hydraulic pre-amplifier. Still another peripheral channel 25 of drive shaft 8 continuously communicates through a duct 11' with the nozzle duct 2', thus connecting duct 2' through a stationary passage 11a' with another pressure chamber 12' formed between the piston 4 and the cylinder 17 of the pre-amplifier.

The piston 4 of the pre-amplifier is normally biased to an adjusted mid-postion by means of helical springs 4a and 4b, the adjustment being effected by means of a set screw 4c. The valve piston 4 of the pre-amplifier has two channel spaces 14 and 14' which, in the illustrated position, communicate with respective hydraulic pressure lines 13 and 13' leading to the hydraulic mechanism, such as a gear-type drive mechanism, of the power motor OM. When the amplifier piston 4 moves toward the left (FIG. 1), the channel 14 in piston 4 connects the oil-pressure inlet conduit 7 with the pressure line 13, and the piston channel 14' connects the oil outlet line 10 with the motor feeder line 13'. The motor OM will then run in a given direction. When the piston 4 shifts toward the right, the piston channel 14' connects the oil inlet line 7 with the motor feeder line 13', while the oil outlet conduit 10 is now connected by piston channel 14 with the feeder line 13, thus causing the hydraulic power motor OM to run in the opposite direction.

As mentioned, the nozzle ducts 2 and 2' are continuously connected through peripheral channel 22 and passage 6 with the pressure-oil inlet line 7, and the bore 15 of the pilot shaft 3 is continuously connected through channel 23 and passage 9 with the oil outlet line 10. Consequently, a limited flow of hydraulic medium is always maintained through the nozzle ducts and 2 and 2'.

Now, when the shaft 3 of the stepping motor or electric pulse-operated pilot motor PM rotates counterclockwise relative to the drive shaft 8 in the direction indicated in FIG. 2 by the arrow A the aperture area of nozzle orifice of duct 2' becomes wider while simultaneously the active cross-sectional area at the orifice 2a of nozzle duct 2 becomes narrower. As a result, the hydraulic back pressure between the orifice members 2a and 2b of nozzle duct 2 increases, whereas the corresponding back pressure in nozzle duct 2' decreases. The increase in pressure is transmitted through duct 11 to the chamber 12 in the pre-amplifier, and the valve piston 4 is forced toward the left. This connects the oil inlet conduit 7 with the feed line 13 of the drive motor OM, and simultaneously connects the line 13 of motor OM with the oil outlet conduit 10. Consequently, the hydraulic medium passes from inlet conduit 7 through line 13 into the motor OM and leaves the motor through line 13' and outlet conduit 10, thus causing the motor to operate in a given direction of rotation.

When the shaft 8 of the power motor OM rotates at an angular speed equal to that of the pulse motor shaft 3, the aperture area of the nozzle duct 2 becomes again equal to that of nozzle duct 2'. Therefore, the two nozzle ducts assume the same pressure and the two chambers 12 and 12' in the pre-amplifier are also placed under the same static pressure. Consequently, the piston 4 moves back to the quiescent position and the rotation of the drive motor OM is stopped.

As a result of the above-described control operation, the shaft 8 of the hydraulic drive motor OM always rotates at an angular speed equal to that of the pulse motor shaft 3, this being by virtue of the accurate mechanical feedback operation described in the foregoing.

The hydraulic motor OM is of the conventional rotary-piston or gear type and hence is capable of rotating in one or the other direction, depending upon which of the two lines 13, 13' receives higher pressure than the other.

In the embodiment shown in FIGS. 3 and 4, the oil-hydraulic pre-amplifier is not used, and the hydraulic pressure medium is supplied directly to the hydraulic power motor OM under control by the two coaxially and concentrically rotatable control structures constituted by the shaft of the pilot motor and the shaft of the drive motor. The shaft 3 of the pilot motor PM and the shaft 8 of the drive motor OM form together the two relatively rotatable components of a rotary valve which is provided with two valve cavities or conduit ducts 19 and 19'. In the embodiment of FIGS. 3 and 4, as in the embodiment of FIG. 1, this rotary valve is located within the same housing as the motor OM, as shown. The shaft 8 has five radial passages denoted by 8a, 8b, 8c, 8d, 8e. Each of these radial passages opens into an annular channel 32, 33, 34, 35 or 36 of a stationary sleeve member 31 in gliding and sealing fit with the peripheral surface of the drive motor shaft 8. The channel 32, communicating with the radial passage 8c, is in continuous communication with an oil inlet conduit line or duct 16. The channels 34 and 36 are in continuous communication with an oil outlet conduit line or duct 17. The channel 33 continuously communicates with a pressure conduit line or duct 18 leading to the drive motor OM, and the channel 35 is in continuous communication with a pressure conduit line or duct 18' of the drive motor.

When the drive is at rest, the cavities 19 and 19' occupy the positions shown in FIGS. 3 and 4. The land portion of the pilot shaft 3, located between the cavities 19 and 19', then closes the passage 8c communicating with the oil inlet line 16, and the outlet line 17, 17' is likewise closed by the pilot shaft.

When the pulse motor PM rotates shaft 3 counterclockwise as indicated by an arrow A in FIG. 4, the cavity 19 acts as a conduit to connect the oil inlet line 16 with the motor feeder line 18, while simultaneously the cavity 19' connects the oil outlet line with the feeder line 18'. Consequently, oil passes from inlet line 16 to one side of the oil-hydraulic motor OM, so that the power motor OM is rotated in the same direction as the pulse motor PM.

When the pulse motor PM rotates in the opposite direction, the cavity 19' connects the oil inlet line 16 through passage 8d with the motor line 18', while the cavity 19 simultaneously connects the oil outlet line 17 with the motor line 18. As a result, the power or drive motor OM now rotates in the opposite direction.

When the speed of the drive shaft 8 is exactly equal to that of the pilot shaft 3, the flow of pressure oil to the drive motor is interrupted and the motor OM will stop. As a result, however, the drive motor OM is always forced to follow the rotation of the pulse motor PM in the same way as described above with reference to the embodiment of FIG. 1; and it will be recognized that the operation of the follow-up speed-controlling regulation is due to the direct mechanical feedback effected by the shaft of the power motor.

It will be obvious to those skilled in the art, upon a study of this disclosure, that our invention permits of various modifications and hence may be embodied in devices other than particularly illustrated and described herein, without departing from the essential features of our invention and within the scope of the claims annexed hereto:

We claim:

1. An electrohydraulic drive for converting pulsed digital command data into hydraulic power, comprising hydraulic pressure fluid supply means, a hydraulic rotary power motor having hydraulic pressure conduit means, an electric-pulse operated stepping motor having a rotatable member, means for connecting said stepping motor to a source of incremental pulse data, said stepping motor being capable of translating said pulse data into predetermined angular displacement of said rotatable member, a fluid pressure control device connecting said supply means with said pressure conduit means, said control device having two concentric and coaxially rotatable control structures of which one is joined with said member of said stepping motor to rotate together therewith and the other is joined with said power motor to rotate together therewith, said two control structures having respective contact surfaces in gliding engagement with each other, each of said two structures having conduit means forming ports located in the contact surface and registrable with the ports of the other structure to a variable degree depending upon the departure of said two structures from a given angular position relative to each other, whereby the flow of pressure fluid to said power motor is metered by said stepping motor to operate said power motor at the rotating speed of said pilot motor.

2. An electrohydraulic drive for converting pulsed digital command data into hydraulic power, comprising hydraulic pressure fluid supply means, a hydraulic rotary power motor having hydraulic pressure conduit means and having a shaft with an axial center bore, an electric-pulse operated stepping motor having a shaft engaging said bore and having a peripheral surface in gliding contact with the peripheral surface of said bore, means for connecting said stepping motor to a source of incremental pulse data, said stepping motor being capable of translating said pulse data into predetermined angular displacement of said shaft thereof, each of said two shafts having conduit means forming ports located in the contact surface and registrable with the ports of the other shaft to a variable degree depending upon the departure of said two shafts from a given angular position relative to each other, said hydraulic motor having a housing, said ports and said contact surface being located within said housing, whereby the flow of pressure fluid to said power motor is metered by said stepping motor to operate said power motor at the rotating speed of said stepping motor.

3. An electrohydraulic drive for converting pulsed digital command data into hydraulic power, comprising an inlet line and an outlet line for hydraulic pressure fluid, a reversible rotary hydraulic power motor having a housing and two pressure conduits within said housing for a rotation of said power motor in one and the other direction depending upon the direction of fluid flow through said conduits, an electric-pulse operated stepping motor joined to said housing to form a unitary drive package, said stepping motor having a rotatable shaft and means for connecting said stepping motor to a source of incremental pulse data, said stepping motor being capable of translating said pulse data into predetermined angular displacement of said rotatable shaft for providing a speed reference for said power motor, fluid pressure control means within said motor housing for selective connecting said two lines with said conduits, said control means comprising a hydraulic pre-amplifier having a valve housing and a displaceable valve member in said valve housing for connecting a selected one of said lines with a given one of said conduits and the other line with said other conduit depending upon the position of said valve member in said housing, said control means further comprising two control structures of circular cross section rotatable in concentric relation to each other and having respective contact surfaces in gliding engagement with each other, one of said two structures being joined with said rotatable shaft of said stepping motor to rotate together therewith, said other structure being joined with said power motor to rotate together therewith, each of said two structures having a group of ducts which have ports located in the contact face of said structure and registable to a varying degree with the group of ports of said other structure depending upon the direction of departure of one of said structures from a given angular position relative to the other, said ducts of said two structures jointly forming fluid passages between said pressure supply lines and said valve housing, whereby said valve member is displaced to control said power motor to run at the speed of said stepping motor.

4. An electrohydraulic drive for converting pulsed digital command data into hydraulic power comprising hydraulic fluid supply conduit means, a hydraulic rotatable power motor having a housing and hydraulic pressure conduit means within said housing, an electric-pulse operated stepping motor joined to said housing to form a unitary drive package, said stepping motor having a rotatable shaft and means for connecting said stepping motor to a source of incremnetal pulse data, said stepping motor being capable of translating said pulse data into predetermined angular displacement of said rotatable shaft for providing a speed control signal for said power motor, two control structures within said housing rotatable in concentric relation to each other and having respective contact faces in gliding engagement with each other, one of said two structures being joined with said shaft of said stepping motor to rotate together therewith, said other structure being joined with said power motor to rotate together therewith, each of said two structures having duct means forming ports located in the contact face of said structure and registrable to a varying degree with the ports of said other structure depending upon the angular position of said two structures relative to each other, said duct means of said two structures jointly forming fluid passages between said supply conduit means and said pressure conduit means of said power motor, whereby the flow of pressure fluid to said power motor is metered by said stepping motor toward operating said power motor at the rotating speed of said pilot motor.

5. An electrohydraulic drive for converting pulsed digital command data into hydraulic power, comprising an inlet line and an outlet line for hydraulic pressure fluid, a reversible rotary hydraulic power motor having a housing and two pressure conduits within said housing for rotation of said power motor in one and the other direction depending upon the direction of fluid flow through said conduits, an electric-pulse operated stepping motor joined to said housing to form a unitary drive package, said stepping motor having a rotatable shaft and means for connecting said stepping motor to a source of incremental pulse data, said stepping motor being capable of translating said pulse data into predetermined angular displacement of said rotatable shaft for providing a speed reference for said power motor, two control structures of circular cross section rotatable within said housing in concentric relation to each other and having respective contact surfaces in gliding engagement with each other, one of said two structures being joined with said shaft of said stepping motor to rotate together with said shaft of said stepping motor to rotate together therewith, said other structure being joined with said power motor to rotate together therewith, each of said two structures having duct means forming ports located in the contact face of said structure and registrable to a varying degree with the ports of said other structure depending upon the direction of departure of one of said structures from a given angular position relative to the other, the outer one of said two structures having its duct means separately in communication with said inlet line and said outlet line and said two conduits, said duct means of said two structures forming, when their respective ports register with each other, a fluid passage between said inlet line and a selected one of said conduits and another fluid passage between said other conduit and said outlet line, whereby the flow of pressure fluid to said power motor is controlled by said stepping motor toward operating said power motor at the rotating speed and direction of said stepping motor.

6. An electrohydraulic drive for converting pulsed digital command data into hydraulic power comprising hydraulic fluid supply conduit means, a hydraulic rotatable power motor having a housing and hydraulic pressure conduit means within said housing, an electric-pulse operated stepping motor having a rotatable pilot member and means for connecting said stepping motor to a source of incremental pulse data, said stepping motor being capable of translating said pulse data into predetermined angular displacement of said pilot member for providing a speed control signal for said power motor, two coaxial shafts of which one has a center bore in which the other has a gliding fit so that said shafts form respective cylindrical contact faces engaging each other, said two shafts being coaxially joined with said pilot member of said stepping motor and said power motor respectively, each of said two shafts having duct means forming ports located in said contact face of the respective shaft and registrable to a varying degree with the ports of said other shaft depending upon the angular position of said shafts relative to each other, said ducts of said two shafts jointly forming fluid passages between said supply conduit means and said pressure conduit means of said power motor, whereby the flow of pressure fluid to said power motor is metered by said stepping motor toward operating said power motor at the rotating speed of said pilot motor.

References Cited in the file of this patent
UNITED STATES PATENTS

| | | |
|---|---|---|
| 2,284,509 | Boes et al. | May 26, 1942 |
| 2,349,641 | Tucker et al. | May 23, 1944 |